(12) United States Patent
Kight

(10) Patent No.: US 8,516,588 B1
(45) Date of Patent: Aug. 20, 2013

(54) STRING DETECTION SYSTEM AND METHOD OF DETECTING A STRING

(75) Inventor: William Dorsey Kight, Glenelg, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1929 days.

(21) Appl. No.: 10/137,899

(22) Filed: May 2, 2002

(51) Int. Cl.
*G06F 11/00* (2006.01)

(52) U.S. Cl.
USPC .................. 726/24; 726/22; 726/23; 726/25; 713/188; 380/265

(58) Field of Classification Search
USPC ................. 713/1, 2, 188, 194; 380/255, 277, 380/200, 201, 77, 265; 726/2, 22–25
See application file for complete search history.

(56) References Cited

U.S. PATENT DOCUMENTS

| | | | | |
|---|---|---|---|---|
| 4,896,934 A | * | 1/1990 | Arthurs et al. | 398/51 |
| 5,003,307 A | * | 3/1991 | Whiting et al. | 341/51 |
| 5,150,430 A | * | 9/1992 | Chu | 382/246 |
| 5,319,776 A | * | 6/1994 | Hile et al. | 726/24 |
| 5,414,833 A | * | 5/1995 | Hershey et al. | 726/22 |
| 5,455,873 A | * | 10/1995 | Cameron, Jr. | 382/270 |
| 5,532,693 A | * | 7/1996 | Winters et al. | 341/51 |
| 5,778,255 A | * | 7/1998 | Clark et al. | 710/68 |
| 5,805,086 A | * | 9/1998 | Brown et al. | 341/51 |
| 5,818,873 A | * | 10/1998 | Wall et al. | 375/240 |
| 5,824,881 A | * | 10/1998 | Shouldice et al. | 73/19.1 |

OTHER PUBLICATIONS

A Dictionary of Computing, Fourth Edition, 24-25, Oxford Univ. Press, 1997.*

* cited by examiner

*Primary Examiner* — Aravind Moorthy
*Assistant Examiner* — Joseph Pan

(57) ABSTRACT

A string detection system preferably includes a buffer for receiving data and parsing that data into strings, and a content addressable memory, connected to the buffer, for receiving the strings and comparing each string with entries in the content addressable memory. This string detection system may be incorporated in an intrusion detection system that monitors a data stream addressed to a host device or network. In an intrusion detection system, the string detection system monitors the data stream for strings which match attack signatures.

48 Claims, 4 Drawing Sheets

STRING DETECTION SYSTEM AND METHOD OF DETECTING A STRING

FIELD OF THE INVENTION

The present invention relates to the field of detecting particular strings in a data stream. More particularly, the present invention relates to a string detection system that uses a content addressable memory. This string detection system may be incorporated into an intrusion detection system for protecting a host device or computer network.

BACKGROUND OF THE INVENTION

Computers and computer networks serve communication and record-keeping functions in almost all modern businesses and other enterprises. The ability to communicate using a computer network and the information stored on that network may be extremely valuable to the company or other entity that operates the network. With the advent of the Internet, to which most other computer networks are connected, the ability to communicate and access data has become a global affair.

Unfortunately, computer networks are also subject to malicious attacks. In some instances, a network may be attacked with the intent to destroy the records kept on the network. Other attacks may be aimed at interrupting communication with, or within, the network. Some attacks may be for the purpose of illicitly obtaining information, rather than an attempt to explicitly harm or disrupt the network. In any event, it becomes necessary for network operators to take whatever measures are available to prevent or neutralize attacks of any nature upon their network.

One such system for addressing attacks on a computer network is an Intrusion Detection System (IDS). The basic function of an IDS is to record signs of intruders at work and to give alerts to network operators.

An IDS typically looks for signs of an attack on a network by comparing network traffic with the signatures of known attacks. Using signature recognition, the IDS examines each packet for a programmed match of known attack patterns. For example, the string "/cgi-bin/phf?" coming into a network can trigger an alarm that someone may be looking for a vulnerable CGI script on a web-server. Most commercial IDS systems are signature based, having several hundred signatures available for selection in a database. The system then monitors incoming network traffic for the selected signatures that are indicative of an attack.

Intrusion Detection Systems to date have used software algorithms for performing the signature detection function. Although signature detection is not algorithmically complex, it is computationally intensive. As a result of both increasing data rates and increasing numbers of signatures, software based Intrusion Detection Systems are failing to keep up with the state of the art in network transmission technology.

Because of the importance of protecting computer networks and the data they contain, there is a need for improved intrusion detection systems.

SUMMARY OF THE INVENTION

The present invention provides, among other things, a string detection system that includes a buffer for receiving data and parsing the data into strings, and a content addressable memory, connected to the buffer, for receiving the strings and comparing each string with entries in the content addressable memory, and a match register connected to the content addressable memory for latching the results of the string comparison operation. The present invention also provides an intrusion detection system that includes a string detection system and an interface for connecting the string detection system to a host device or a network.

The present invention also provides a method of detecting a string by parsing a data stream into strings and comparing each such string with entries in a content addressable memory. The parsing preferably includes taking a word of N bytes from the data stream, sending the word to the content addressable memory, discarding one byte of the word, replacing the discarded byte with another byte from the data stream to form a new word, comparing the new word to the entries in the content addressable memory and repeating the discarding, replacing and re-sending while the data stream is received. The results of each comparison are stored within a match register for subsequent analysis.

BRIEF DESCRIPTION OF THE DRAWINGS

The accompanying drawings illustrate preferred embodiments of the present invention and are a part of the specification. Together with the following description, the drawings demonstrate and explain the principles of the present invention. The illustrated embodiments are examples of the present invention and do not limit the scope of the invention.

Throughout the drawings, identical reference numbers designate similar, but not necessarily identical, elements.

DETAILED DESCRIPTION OF THE PREFERRED EMBODIMENTS

As noted above, most Intrusion Detection Systems (IDS) operate on the basis of string recognition. Incoming data to a protected host device or network is searched for a string, also referred to as a signature, that is indicative of an attack on the device or network, referred to as an attack signature. When such a string is identified, precautionary measures can be implemented, including notification to the system operator.

The present invention provides, among other things, an improved system that can be used to search a data stream for a particular, predetermined string. Consequently, an important application of the present invention may be in an IDS that identifies attacks on a host device or network by identifying particular strings or signatures in a data stream.

Figure 1:
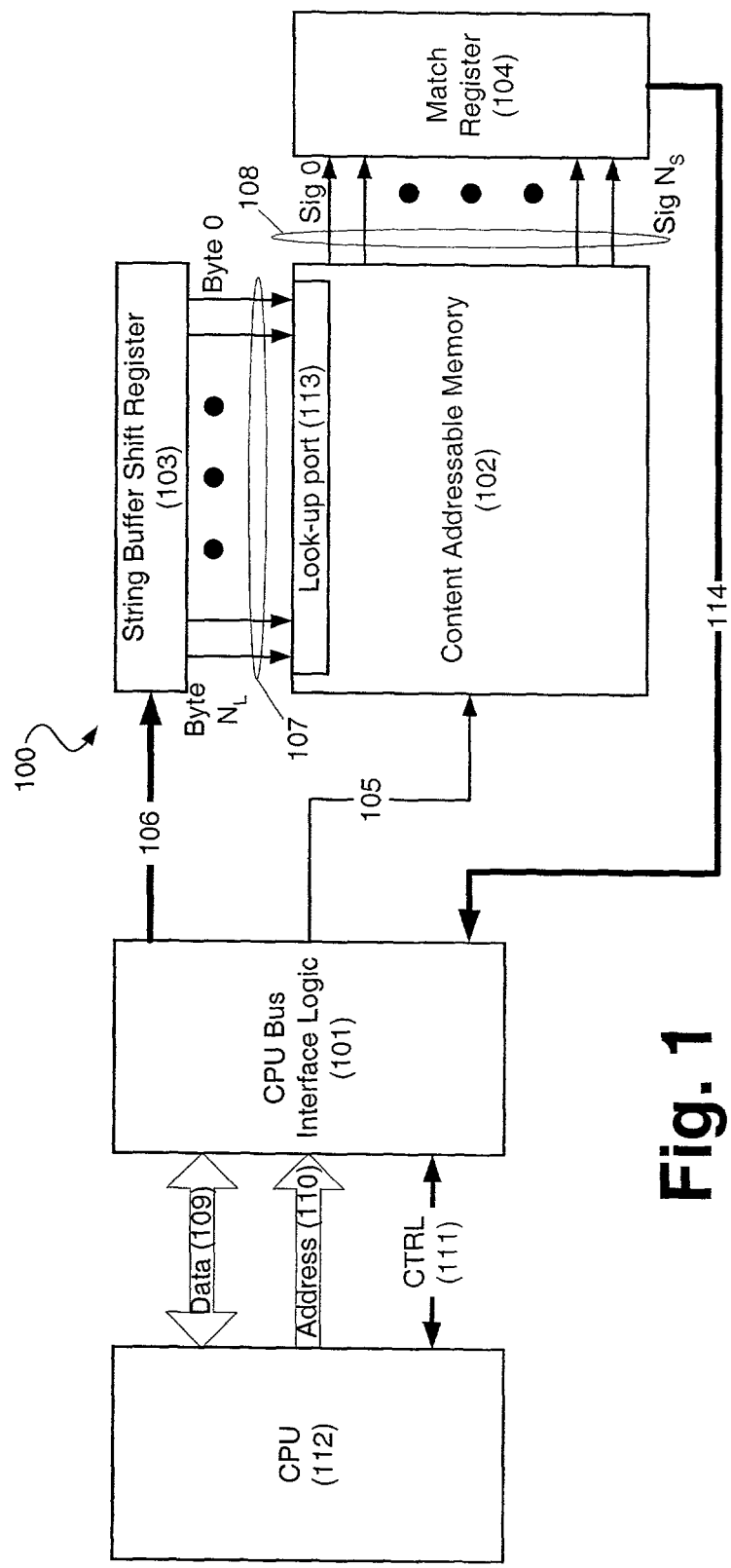
FIG. 1 is an illustration of one embodiment of a string detection system incorporated in an Intrusion Detection System (IDS) according to principles of the present invention.

FIG. 1 is an illustration of one embodiment of a string detection system (100) as incorporated into an IDS. As shown in FIG. 1, the IDS includes central processing unit (CPU) (112) that is connected through interface (101) to string detection system (100). Through interface (101), CPU (112) provides string detection system (100) with a data stream (109) that is to be checked for strings that are signatures of an attack upon the host device or network. CPU (112) typically obtains the information to construct data stream (109) from a network interface (not shown) operatively connected to CPU (112).

CPU (112) also provides control information (111) and memory address information (110) to string detection system (100). The control information (111) provides string detection system (100) with the strings that are to be identified in the incoming data stream (109) as indicative of an attack on the host device or network. This control information (111) is provided to content addressable memory (102) over line (105).

Content addressable memory unit (102) stores all the strings or signatures for which string detection system (100) will search in the incoming data stream (109). A content-addressable memory is a memory unit that can be accessed in parallel on the basis of content rather than by a specifically identified address or location. Also called "associative memory," the content addressable memory unit is a kind of data storage device that includes comparison logic with each bit of storage. Consequently, a data value can be broadcast to all the words in storage and compared with the values there. Words that match can be flagged in some way for subsequent retrieval or other operations. Thus, the memory operates based on the content of the stored data rather than on associating a memory location with each bit of data. The use of a mask register within the content addressable memory allows for the entry of "don't care" values and match strings of varying length.

Incoming data stream (109) is provided through interface (101) to a string buffer shift register (103) over line (106). String buffer shift register (103) will take the first $N_L$ bytes from the data stream as a word. This word is then sent from string buffer shift register (103) to content addressable memory (102) via a parallel bus (107).

Parallel bus (107) is connected to a look-up port (113) of content addressable memory (102). Through look-up port (113), content addressable memory (102) receives the word from string buffer shift register (103). Based on the content of the incoming word, content addressable memory (102) then simultaneously compares the incoming word against all the entries stored in content addressable memory (102), i.e., the strings that have been pre-loaded to content addressable memory (102) as indicative of an attack being made on the host device.

If one or more matches are found, a string indicative of an attack has been identified in the data stream (109). A word of size $N_S$ bytes, that corresponds to the number of entries in the content addressable memory, is output on bus (108) to a match register (104). Bits in particular positions within the $N_S$ word correspond to particular entries within memory (102). If an entry in memory (102) has been matched, its corresponding bit in the $N_S$ word is set to indicate that match. Consequently, by virtue the position of the set bits, the $N_S$ word indicates which entries within memory (102) have been "matched." The match results are latched and held by match register (104) and then reported to the CPU (112) via line (114), logic (101) and data line (109).

Upon receipt of the match results, CPU (112) may be programmed to respond in a variety of ways. For example, CPU (112) may respond by recording the event, notifying a system operator, or by interrupting the communication. Additionally, CPU (112) may respond differently depending on what the matched word is. Different types of attacks will be indicated by different matched words or signatures. Thus, different matched words, indicating different types of attacks on the host device, may invoke different responses.

The content addressable memory (102) requires a small but finite amount of hold-time to examine each word presented to it by string buffer shift register (103) and to latch the results in match register (104). Operating automatically at a rate that does not violate the hold-time requirements, string buffer shift register (103) will discard the first byte it received, shift all bytes over one position (e.g., toward Byte 0 in FIG. 1) and read the next byte from data stream (109) via data line (106) into the empty position (e.g., Byte $N_L$ in FIG. 1).

Following this operation, the newly formed word of $N_L$ bytes is output by string buffer shift register (103) over bus (107) to look-up port (113) of content addressable memory (102). The memory (102) repeats the process of simultaneously checking all entries for a match with the incoming word from string buffer shift register (103). If a match is found, it is latched by match register (104). The process then repeats with string buffer shift register (103) discarding the oldest byte (e.g., Byte 0 in FIG. 1), shifting all bytes over one position as before, and outputting a new word of $N_L$ bytes to memory (102).

In this way, string detection system (100) searches each possible word of $N_L$ bytes within data stream (109) for known attack signatures. Thus, an attack signature string, no matter how embedded in the incoming data stream, will be isolated and identified by system (100).

The ability of content addressable memory unit (102) to simultaneously check all entries against an incoming word at look-up port (113) contributes to the ability of the signature detection system (100) to check, in real-time, every word of $N_L$ bytes in the data stream for an attack signature. In a worst-case scenario, signature detection system (100) requires one operation to scan a given string of $N_L$ bytes against a database of $N_S$ signatures; an equivalent software search would require as many as $N_L \times N_S$ operations to perform the same search.

As will be appreciated by those skilled in the art, if a particular attack signature is longer than $N_L$ bytes, it can be truncated as an entry in content addressable memory (102). The system (100) will still match an $N_L$-byte portion of an incoming attack signature with the truncated form stored in memory (102). Alternatively, an attack signature longer than $N_L$ bytes can be stored in the content addressable memory unit (102) in its entirety using multiple entries.

Figure 2:
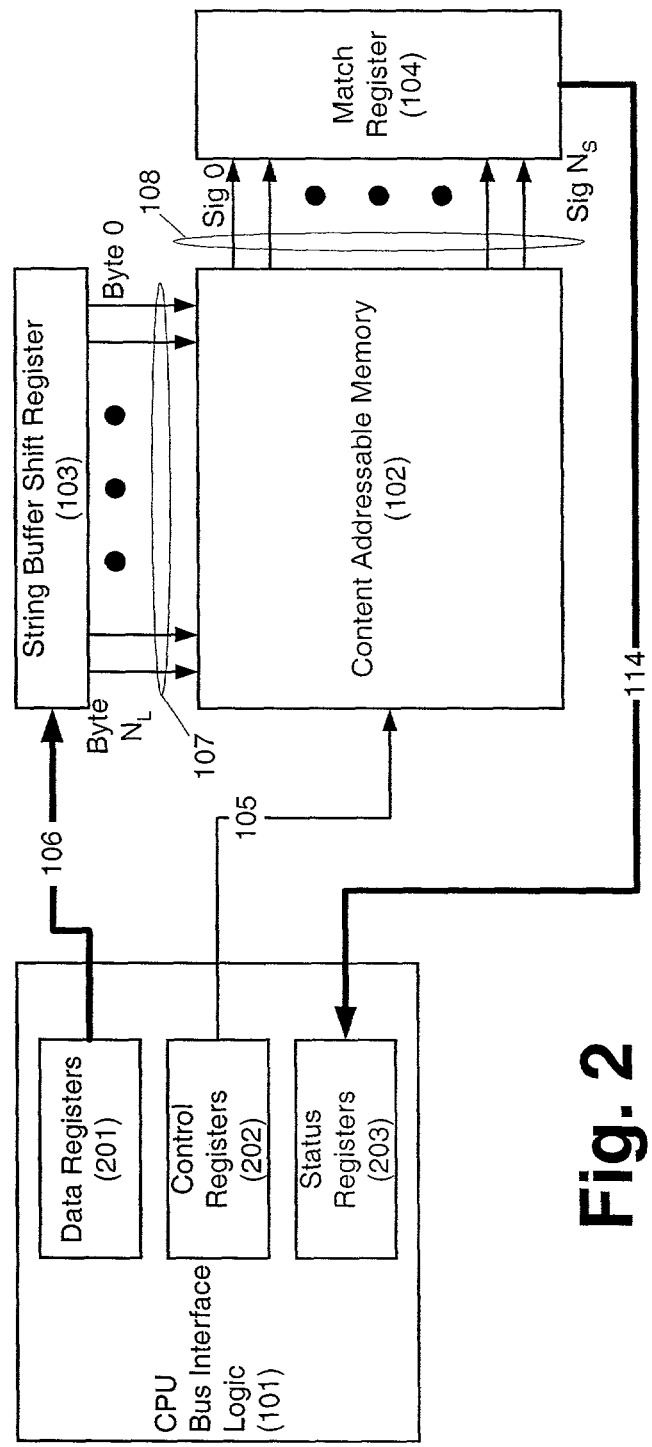
FIG. 2 is a more detailed illustration of the string detection system of FIG. 1.

FIG. 2 is a more detailed illustration of the string detection system of FIG. 1. FIG. 2 provides additional details of the preferred structure for the CPU bus interface (101). In order to perform as described within the string detection system (100) of the present invention, interface (101) incorporates some logic components.

As shown in FIG. 2, the interface logic preferably includes one or more data registers (201). These data registers (201) provide the data stream on line (106) to string buffer shift register (103). A typical function of data register (201) is to provide a first-in-first-out buffer allowing CPU (112) to queue up data for processing at a burst rate greater than signature detection system (100) can typically handle.

The interface logic also preferably includes one or more control registers (202). These registers (202) receive the attack signatures and associated masks that are to be stored in content addressable memory (102) and to which each possible $N_L$ word of the incoming data stream is compared to monitor for an attack. The control registers (202) feed the attack signatures and associated masks into content addressable memory (102). The control registers (202) are also used to reset the device and clear the match indications held by the match register (104).

The attack signatures can be provided to control registers (202) from a number of possible sources. For example, a user interface on CPU (112) or a device connected to CPU (112) can be operated by a user to input the attack signatures for which the string detection system (100) is to search. Alternatively, a list of attack signatures can be provided electronically to CPU (112) from some data storage device or data transmission.

Finally, the interface logic also preferably includes a status register (203). Status register (203) receives the match indications from match register (104) that have been matched in the incoming data stream. Line (114) provides the match indications from match register (104) to status register (203). Status register (203) retains the match indications until match indications can be read by CPU (112) and appropriate action taken based on the programmed response for that particular attack signature or any attack signature generally.

Figure 3:
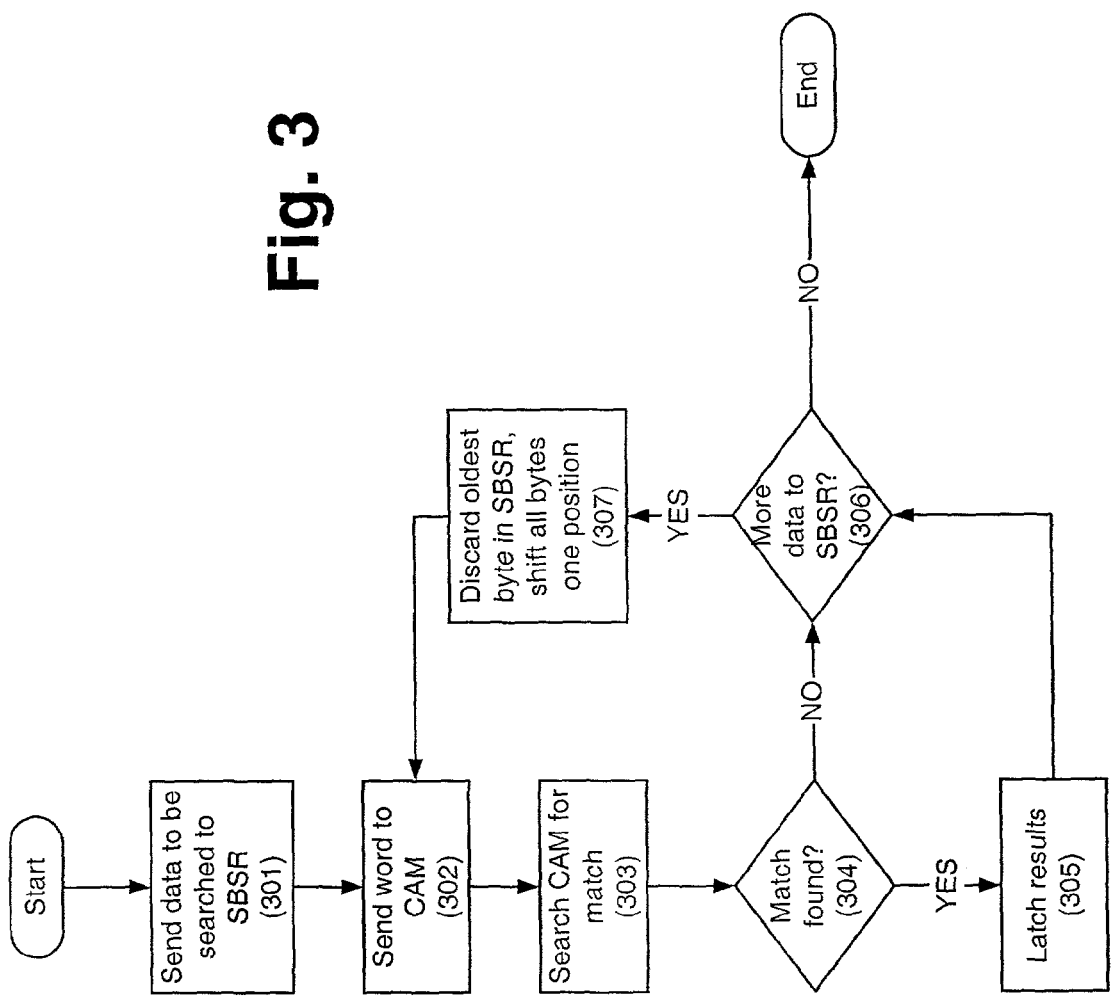
FIG. 3 is a flowchart detailing the operation of the string detection system of FIGS. 1 and 2.

FIG. 3 is a flowchart detailing the operation of the string detection system of FIGS. 1 and 2. As shown in FIG. 3, the stream of data to be searched is provided to the string detection system. The data stream is fed into a string buffer shift register (SBSR). (301). The string buffer shift register takes each sequence of bytes in the data stream that is $N_L$ bytes long and provides those sequences as words to the look-up port of a content addressable memory (CAM). (302).

The content addressable memory will use the content value of each word submitted by the string buffer shift register and simultaneously check each entry stored in the content addressable memory for a match with the word submitted by the string buffer shift register. (303). The entries in the content addressable memory are known signatures that signal an attack on the host device or network that is receiving the data stream and is being protected by the string detection system. If one or more matches are found (304), one or more bits corresponding to the matching entries in the content addressable memory are latched in the match register (305). If no match is found, the string detection system will continue to parse incoming data looking for a match.

Assuming that more data is incoming and being provided to the string buffer shift register (306), the string buffer shift register will take the next $N_L$ byte sequence of bytes from the data stream by discarding the oldest byte in the string buffer shift register. All the remaining bytes are then shifted one position to fill the place of the discarded byte. The next byte in the data stream is then added to the bytes in the shift register to again complete a word of $N_L$ bytes. (307).

This new word of $N_L$ bytes is then sent to the content addressable memory (302) and the cycle repeats. The content addressable memory will use the content value of each word submitted by the string buffer shift register and simultaneously check each entry stored in the content addressable memory for a match with the word submitted by the string buffer shift register. (303). As illustrated in FIG. 3, this cycle preferably repeats so long as data is being fed to the string detection system (306).

When the incoming data is exhausted the CPU may examine the results of the comparison operation. If one or more matches have been found, then the CPU may take appropriate action to include, but not limited to, recording the event, notifying a system operator, or interrupting the communication.

Figure 4:
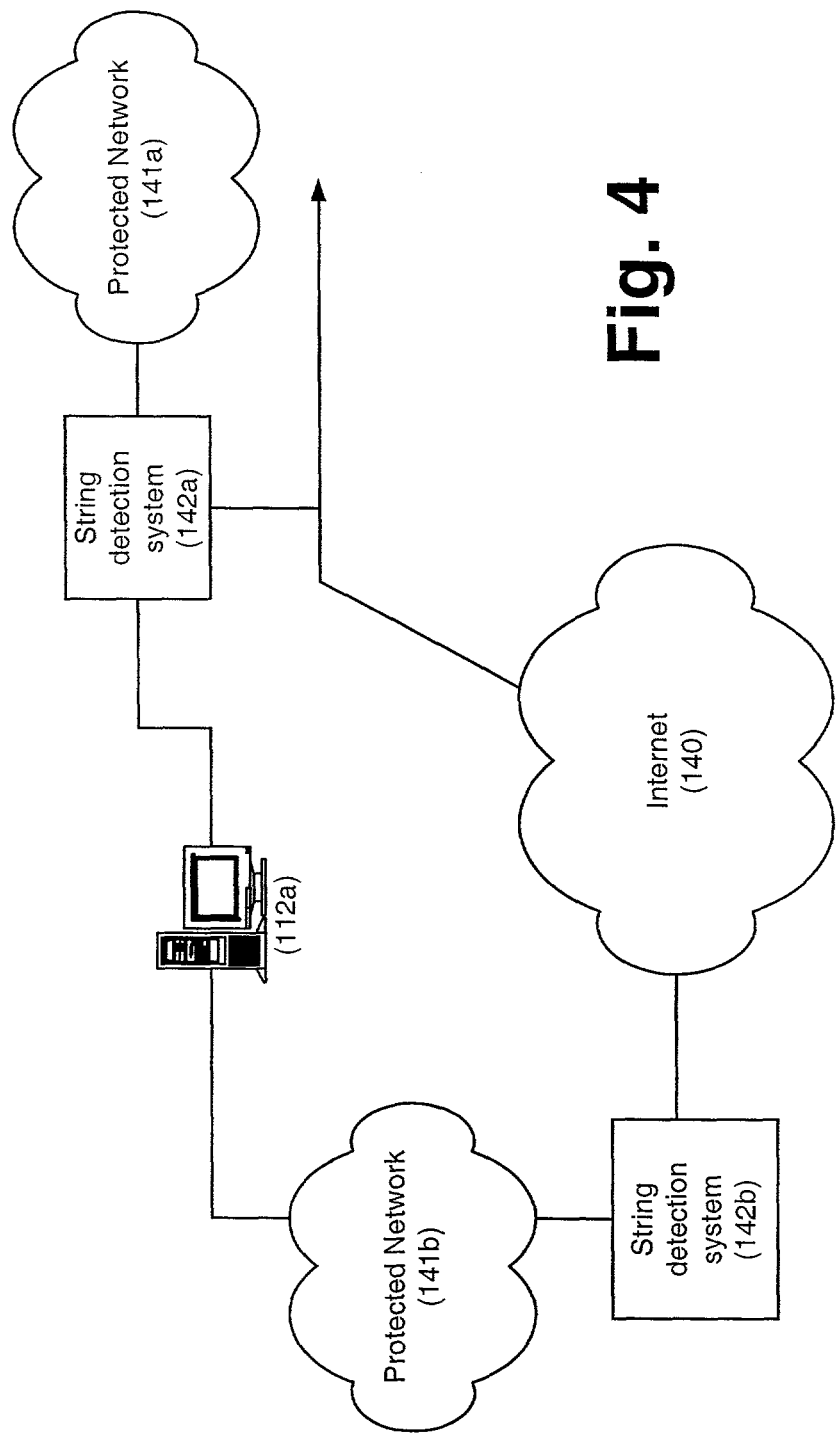
FIG. 4 is a diagram of a string detection system according to principles of the present invention incorporated into a network-based IDS.

As shown in FIG. 4, there may be one or more proprietary networks (141a, 141b) that should be protected from attacks. These networks (141a, 141b) may be local area networks (LANs), wide area networks (WANs), wireless networks, any other kind of data sharing networks or any combination thereof. In most instances, these networks (141a, 141b) will be connected to the Internet (140) as shown in FIG. 4. A connection to the Internet gives a smaller network both global communications capability and access to the largest store of data available. However, the connection to the Internet also provides a path for malicious attacks on the smaller network or its host devices.

A string detection system based on the principles of the present invention can be used to monitor the data stream being provided to a protected network or network segment. These string detection systems (142a, 142b) operate in the same manner described in detail above.

The stream of data coming into the protected network or through the protected network, runs through the string detection system (142a, 142b). As it does so, each sequence of the data stream composing a word $N_L$-bytes long is compared by a content addressable memory for a match with any of a list of signatures that indicate an attack on the network or its host devices.

As shown in FIG. 4, for example, a protected network (141a) is connected to the Internet (140). That connection to the Internet (140) passes through a string detection system (142a). As a data stream is received from the Internet (140) to the protected network (141a), the string detection system (142a) can, in real-time, parse through each packet of the data stream, searching that data stream for a string that matches the signature of an attack on the network or its host devices.

Similarly, another network (141b) or segment of a protected network may be separately connected to the Internet (140). That connection also preferably passes through a second string detection system (142b) that, again, parses the data packets of the data stream for the signature of an attack.

As shown in FIG. 4, a number of string detection systems (142a, 142b) like those described, may report to a control system (112a). This may be, for example, the workstation of a system administrator. Alternatively, it may be a monitoring device that is configured to receive reporting from the string detection systems monitoring the network and respond appropriately in the event that an attack is anywhere detected in the network. The types of responses may be, for example, those noted above.

The foregoing description has focused on the ability of the string detection systems of the present invention to monitor networks for malicious attacks. However, the string detection systems of the present invention have a much wider field of use. For example, a string detection system may also be used to monitor a network for inappropriate use or to protect confidential or sensitive information. Furthermore, string detection and searching has broader application within database search and retrieval systems or law enforcement and intelligence gathering operations.

An important aspect of the present invention is the recognition that a content addressable memory unit can be used in a string detection system to, in real-time, search a data stream for any of a number of identifiable strings. While a number of applications of such a string detection system have been described herein, there are many other applications that will be apparent to those skilled in the art. All such applications are within the scope and spirit of the present invention.

The preceding description has been presented only to illustrate and describe the invention. It is not intended to be exhaustive or to limit the invention to any precise form disclosed. It is intended that the scope of the invention be defined by the following claims.

What is claimed is:
1. A string detection system comprising:
a buffer for receiving data and parsing said data into strings;
a content addressable memory, connected to said buffer, for receiving said strings and comparing each one of said strings with pre-loaded entries in said content address- able memory to obtain comparisons, said pre-loaded entries including attack signatures;

wherein said content addressable memory is configured to generate a results word having a predetermined number of bits that each correspond to one of the pre-loaded entries in said content addressable memory, wherein the results word generated by said content addressable memory represents at least two attack signatures identified within one of said strings;

a match register configured to receive the results word generated by said content addressable memory and latch the results of said comparisons based on the results word; and a central processing unit programmed to receive the results and to provide different responses according to different types of attacks that may be detected, the different responses including at least two of (1) recording an event that includes receipt of the data, (2) notifying a system operator, and (3) interrupting a communication that includes the data.

2. The string detection system of claim 1, further comprising an interface for interfacing said string detection system with another device.

3. The string detection system of claim 2, wherein said interface comprises:
 a data register for supplying said data to said buffer;
 a control register for providing said entries to said content addressable memory; and
 a status register for receiving output from said match register.

4. The string detection system of claim 1, wherein at least one bit in the results word is set to indicate each attack signature identified.

5. The string detection system of claim 4, wherein a location within the results word of each set bit indicates which of the at least two attack signatures were identified.

6. The string detection system of claim 1, wherein at least one of the pre-loaded entries is truncated to the predetermined number of bits.

7. The string detection system of claim 1, wherein at least one pre-loaded entry represents a portion of one of the attack signatures.

8. An intrusion detection system operatively coupled to a host device or network, said intrusion detection system comprising:
 a string detection system comprising a buffer for receiving data and parsing said data into strings and a content addressable memory, connected to said buffer, for receiving said strings and comparing each one of said strings with pre-loaded entries in said content addressable memory to obtain comparisons and a match register for latching the results of said comparisons;
 wherein said content addressable memory is configured to generate a results word having a predetermined number of bits that each correspond to one of the pre-loaded entries in said content addressable memory, wherein the results word generated by said content addressable memory represents at least two attack signatures identified within one of said strings;
 an interface for connecting said string detection system to said host device or said network; and
 a central processing unit programmed to receive the results and to provide different responses according to different types of attacks that may be detected, the different responses including at least two of (1) recording an event that includes receipt of the data, (2) notifying a system operator, and (3) interrupting a communication that includes the data.

9. The intrusion detection system of claim 8, wherein said interface comprises:
 a data register for supplying said data to said buffer;
 a control register for providing said entries to said content addressable memory; and
 a status register for receiving output from said match register.

10. The intrusion detection system of claim 8, wherein said interface connects said string detection system with said host device.

11. The intrusion detection system of claim 8, wherein said interface connects said string detection system to a network.

12. The intrusion detection system of claim 11, wherein said interface connects said string detection system to said network at a point at which data from outside said network enters said network, said string detection system monitoring said incoming data.

13. The intrusion detection system of claim 11, further comprising:
 a plurality of string detection systems, each one of said systems comprising a buffer for receiving data and parsing said data into strings and a content addressable memory, connected to said buffer, for receiving said strings and comparing each one of said strings with entries in said content addressable memory to obtain comparisons and a match register for latching the results of said comparisons; and
 an interface for each one of said string detection systems for connecting said each one of said string detection systems to said network;
 wherein said string detection systems are connected to said network at different points so as to monitor data entering or moving within said network.

14. The intrusion detection system of claim 13, further comprising a control system to which all of said string detection systems are connected, wherein said control system receives output from said string detection systems.

15. The intrusion detection system of claim 14, wherein said control system responds when one of said string detection systems signals detection of an attack signature.

16. The intrusion detection system of claim 8, wherein said entries in said content addressable memory comprise strings indicative of confidential information.

17. The intrusion detection system of claim 8, wherein said entries in said content addressable memory comprise strings indicative of offensive or abusive material that a network operator has identified.

18. A method of detecting a string comprising:
 parsing a data stream into strings; and
 comparing each one of said strings with a plurality of entries pre-loaded in a content addressable memory to obtain a like plurality of comparisons, said pre-loaded entries including a plurality of attack signatures;
 generating a results word based on the comparisons, wherein the results word includes a predetermined number of bits that each correspond to one of said pre-loaded entries in said content addressable memory and wherein the results word represents at least two attack signatures identified within one of said strings; and
 providing different responses according to different types of attacks that may be detected, the different responses including at least two of (1) recording an event that includes receipt of the data, (2) notifying a system operator, and (3) interrupting a communication that includes the data.

19. The method of claim 18, wherein said parsing further comprises:
taking a word of N bytes from said data stream;
sending said word to said content addressable memory;
discarding one byte of said word to obtain a discarded byte;
replacing said discarded byte with another byte from said data stream to form a new word;
re-sending said new word to said content addressable memory; and
repeating said discarding, replacing and re-sending while said data stream is being received.

20. The method as set forth in claim 18, wherein generating the results word includes setting at least one bit in the results word to indicate each attack signature identified.

21. The method of claim 20, wherein setting the at least one bit includes setting the bits in locations within the results word that correspond to the at least two attack signatures identified.

22. The method of claim 18, further comprising truncating at least one of the attack signatures pre-loaded in the content addressable memory.

23. The method of claim 18, further comprising splitting the attack signature into a plurality of pre-loaded entries.

24. A method of detecting attacks on a network or host device, said method comprising:
detecting a string in an incoming data stream that matches at least two of a plurality of attack signatures pre-loaded in a content addressable memory of a string detection system that receives said incoming data stream, said content addressable memory being accessible in parallel based on said attack signatures;
generating a results word that represents the at least two attack signatures detected, wherein the results word has a predetermined number of bits that each correspond to one of the attack signatures pre-loaded in said content addressable memory; and
providing different responses according to different types of attacks that may be detected, the different responses including at least two of (1) recording an event that includes receipt of the data, (2) notifying a system operator, and (3) interrupting a communication that includes the data.

25. The method of claim 24, further comprising:
buffering said data stream as said data stream is received by said string detection system;
parsing said data stream into a plurality of strings; and
submitting said plurality of strings to said content addressable memory.

26. The method of claim 25, further comprising identifying at least two entries in said content addressable memory, out of a plurality of entries in said content addressable memory, that matches one of said plurality of strings that is input to said content addressable memory to obtain at least two identified entries, wherein the results word represents the at least two identified entries.

27. The method of claim 26, further comprising transmitting said results word to a control system, thus making a transmission of said identified entries.

28. The method of claim 27, further comprising responding to said transmission of said results word, thus making a response to said transmission of said results word.

29. The method of claim 28, wherein said response is determined by which of said plurality of entries in said content addressable memory are represented by said results word.

30. The method of claim 28, wherein said responding to said transmission of said results word further comprises notifying a system operator.

31. The method of claim 24, further comprising interfacing said string detection system with a network at a point at which data from outside said network enters said network, said string detection system monitoring said incoming data.

32. The method of claim 24, further comprising:
interfacing a plurality of string detection systems with said network, wherein each string detection system comprises a buffer for receiving data and parsing said data into strings and a content addressable memory, connected to said buffer, for receiving said strings and comparing each string with a plurality of entries stored in said content addressable memory and a match register for latching output from said content addressable memory;
wherein said string detection systems are connected to a network at different points so as to monitor data entering or moving within said network.

33. The method of claim 32, further comprising controlling said plurality of string detection systems with a common control system to which each of said plurality of string detection systems is connected, wherein said control system receives output from each of said plurality of string detection systems.

34. The method of claim 24, further comprising responding to identification of said string from said incoming data stream that matches an attack signature stored in said content addressable memory, thus making a response.

35. The method of claim 34, wherein said response corresponds to one of said plurality of pre-loaded attack signatures that matches said string from said incoming data stream.

36. A system for detecting a string comprising:
means for parsing a data stream into strings;
means for comparing each one of said strings with a plurality of entries pre-loaded in a content addressable memory to obtain comparisons, said pre-loaded entries including a plurality of attack signatures;
means for generating a results word based on the comparisons, wherein the results word includes a predetermined number of bits that each correspond to one of said pre-loaded entries in said content addressable memory and wherein the results word represents at least two attack signatures identified within one of said strings; and
means for latching the results of said comparisons based on the results word; and
means for receiving the results and providing different responses according to different types of attacks that may be detected, the different responses including at least two of (1) recording an event that includes receipt of the data, (2) notifying a system operator, and (3) interrupting a communication that includes the data.

37. The system of claim 36, wherein said means for parsing further comprise:
means for taking a word of N bytes from said data stream;
means for sending said word to said content addressable memory;
means for discarding one byte of said word to obtain a discarded byte;
means for replacing said discarded byte with another byte from said data stream to form a new word;

means for re-sending said new word to said content addressable memory; and means for repeating said discarding, replacing and re-sending while said data stream is being received.

38. The system of claim 36, further comprising means for signaling that an attack has occurred upon matching of a string from said data stream and one of said attack signatures in said content addressable memory.

39. The system of claim 38, further comprising means for responding with a response to detection of said attack wherein said response corresponds specifically to said one of said attack signatures in content addressable memory that matches said string from said data stream.

40. The system of claim 36, further comprising means for interfacing said system with a host device, wherein said data stream is addressed to said host device.

41. The system of claim 36, further comprising means for interfacing said system with a network, wherein said data stream is moving into or within said network.

42. A string detection system comprising:
   a buffer for receiving data and parsing said data into strings;
   a memory, connected to said buffer, for receiving said strings and comparing each one of said strings with pre-loaded entries in said memory to obtain comparisons, said pre-loaded entries including attack signatures;
   wherein said memory is configured to generate a results word having a predetermined number of bits that each correspond to one of the pre-loaded entries in said memory, wherein the results word generated by said memory represents at least two attack signatures identified within one of said strings; and
   a match register configured to receive the results word generated by said memory and latch the results of said comparisons based on the results word.

43. The string detection system of claim 42, further comprising a central processing unit programmed to receive the results and to provide different responses according to different types of attacks that may be detected, the different responses including at least two of (1) recording an event that includes receipt of the data, (2) notifying a system operator, and (3) interrupting a communication that includes the data.

44. The string detection system of claim 42, further comprising an interface for interfacing said string detection system with another device.

45. The string detection system of claim 44, wherein said interface comprises:
   a data register for supplying said data to said buffer;
   a control register for providing said pre-loaded entries to said memory; and
   a status register for receiving output from said match register.

46. A method of detecting a string comprising:
   parsing a data stream into strings; and
   comparing each one of said strings with a plurality of pre-loaded entries in a memory to obtain a plurality of comparisons, said pre-loaded entries including a plurality of attack signatures; and
   generating a results word based on the comparisons, wherein the results word includes a predetermined number of bits that each correspond to one of said pre-loaded entries in said memory and wherein the results word represents at least two attack signatures identified within one of said strings.

47. The method of claim 46, wherein said parsing further comprises:
   taking a word of N bytes from said data stream;
   sending said word to said memory;
   discarding one byte of said word to obtain a discarded byte;
   replacing said discarded byte with another byte from said data stream to form a new word;
   re-sending said new word to said memory; and
   repeating said discarding, replacing and re-sending while said data stream is being received.

48. The method of claim 46, further comprising, providing different responses according to different types of attacks that may be detected, the different responses including at least two of (1) recording an event that includes receipt of the data, (2) notifying a system operator, and (3) interrupting a communication that includes the data.

* * * * *